US012706415B2

(12) United States Patent
Li et al.

(10) Patent No.: US 12,706,415 B2
(45) Date of Patent: Aug. 11, 2026

(54) ON-VEHICLE CONNECTOR UNIT

(71) Applicant: JAPAN AVIATION ELECTRONICS INDUSTRY, LIMITED, Tokyo (JP)

(72) Inventors: Teng Li, Tokyo (JP); Kazunobu Nakamura, Tokyo (JP); Naoki Iwao, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 318 days.

(21) Appl. No.: 18/577,789

(22) PCT Filed: Apr. 18, 2022

(86) PCT No.: PCT/JP2022/018021
§ 371 (c)(1),
(2) Date: Jan. 9, 2024

(87) PCT Pub. No.: WO2023/013186
PCT Pub. Date: Feb. 9, 2023

(65) Prior Publication Data
US 2024/0332857 A1 Oct. 3, 2024

(30) Foreign Application Priority Data

Aug. 3, 2021 (JP) ................................ 2021-127041
Aug. 3, 2021 (JP) ................................ 2021-127329
Sep. 7, 2021 (JP) ................................ 2021-145609

(51) Int. Cl.
*H01R 13/52* (2006.01)
*H01R 13/74* (2006.01)

(52) U.S. Cl.
CPC ....... *H01R 13/521* (2013.01); *H01R 13/5227* (2013.01); *H01R 13/74* (2013.01); *H01R 2201/26* (2013.01)

(58) Field of Classification Search
CPC .. H01R 13/521; H01R 13/5227; H01R 13/74; H01R 2201/26
(Continued)

(56) References Cited

U.S. PATENT DOCUMENTS 3,935,686 A 2/1976 Dozois
9,653,842 B2 5/2017 Savage et al.
(Continued)

FOREIGN PATENT DOCUMENTS

CN 205389046 7/2016
CN 208797255 4/2019
(Continued)

OTHER PUBLICATIONS

International Search Report issued in International Patent Application No. PCT/JP2022/018021, dated Jun. 21, 2022, along with an English translation thereof.
(Continued)

*Primary Examiner* — Gary F Paumen
(74) *Attorney, Agent, or Firm* — Greenblum & Bernstein, P.L.C.

(57) ABSTRACT

An on-vehicle connector unit, which is to be attached to a partition through which a cabin side and a vehicle body side are partitioned, comprises a case having a tubular part and a front surface plate part located at a front end of the tubular part, a circuit board accommodated in the tubular part, an interface connector that is mounted on the circuit board and connected to a connector of an electronic device on the cabin side, a rear surface cover that blocks a rear end of the tubular part, and an internal connector that is held by the rear surface cover and connected to a harness connector on the vehicle body side. The front surface plate part is provided with an
(Continued)

opening through which the interface connector faces the cabin side, and drain holes communicating with the internal space of the tubular part.

24 Claims, 11 Drawing Sheets

(58) Field of Classification Search
USPC .......................................................... 439/571
See application file for complete search history.

(56) References Cited

U.S. PATENT DOCUMENTS

| | | | | |
|---|---|---|---|---|
| 2009/0298310 | A1* | 12/2009 | Nakanishi | H02G 3/088 439/76.2 |
| 2014/0328076 | A1 | 11/2014 | Firman, II et al. | |
| 2020/0043314 | A1* | 2/2020 | Wang | E05B 73/0029 |

FOREIGN PATENT DOCUMENTS

| | | |
|---|---|---|
| CN | 208986250 | 6/2019 |
| CN | 209200700 | 8/2019 |
| EP | 3778362 | 2/2021 |
| EP | 3778363 | 2/2021 |
| JP | 2009-290941 | 12/2009 |
| JP | 2015-115511 | 6/2015 |
| JP | 2020-77557 | 5/2020 |
| KR | 10-2021-0012404 | 2/2021 |
| WO | 2019/187791 | 10/2019 |
| WO | 2019/188784 | 10/2019 |

OTHER PUBLICATIONS

Extended European Search Report Issued in Corresponding EP Patent Application No. 22852615.8, dated Sep. 25, 2024.
Office Action Issued in Corresponding Indian Patent Application No. 202317088088, dated Jul. 9, 2026, along with an English translation thereof.

* cited by examiner

ON-VEHICLE CONNECTOR UNIT

TECHNICAL FIELD

The present invention relates to an on-vehicle connector unit to be used while attached to a vehicle.

BACKGROUND ART

FIG. 1 shows a USB port described in Patent Literature 1 as a conventional example of this type of on-vehicle connector unit. This USB port 10 is attached to an inner box of a motorcycle, and FIG. 2 shows a state where the USB port 10 is attached to a back wall 20 of the inner box. In FIG. 1, reference numeral 30 denotes a USB plug of an external device such as a smart phone to be connected to the USB port 10.

The USB port 10 comprises a mouthpiece part 11 as a mechanical joint for inserting and removing a USB plug 30 in an insertion/removal direction indicated by an arrow a, and a casing 12 that supports the mouthpiece part 11 and is fixed to the vehicle body side. A mouthpiece holding part 12*a* covering the outer periphery of the mouthpiece part 11 is formed in the casing 12. The USB port 10 is arranged such that a port opening 11*a* at the tip of the mouthpiece part 11 faces downward when the USB port 10 is mounted in the vehicle, in other words, the entire body of the USB port 10 including the casing 12 is arranged at an angle when the USB port 10 is mounted in the vehicle.

A flange 13 is provided on the casing 12, and a hood 14 is further provided so as to be in close proximity to or in contact with the back surface of the back wall 20. The flange 13 serves as a water cut-off part that guides water flowing along the casing 12 to the outside of the port opening 11*a*. A coupler 15 is provided on the rear end side of the casing 12 such that a vehicle-body-side harness routed on the vehicle body side is connectable to the coupler 15.

A circuit board 16 is accommodated in the casing 12. The casing 12 is shaped such that a part serving as a lower surface side when the casing 12 is mounted in the vehicle is open. By injecting and filling potting resin 17 into the casing 12 from the open part of the lower surface side, the circuit board 16 is sealed in a watertight state. The lower surface of the casing 12 when the casing 12 is mounted in the vehicle serves as a potting surface 17*a* where the potting resin 17 is exposed.

PRIOR ART LITERATURE

Patent Literature

Patent Literature 1: International Publication No. WO2019/187791

SUMMARY OF THE INVENTION

Problems to be Solved by the Invention

As described above, in the USB port 10 shown in FIGS. 1 and 2, the potting resin 17 is filled in the casing 12 in which the circuit board 16 is accommodated, thereby sealing the circuit board 16 in a watertight state.

However, a work of filling the potting resin 17 in the casing 12 in this way is troublesome and requires a lot of man-hours, resulting in an increase in cost.

In view of this problem, an object of the present invention is to provide an on-vehicle connector unit which has a structure capable of withstanding water exposure (covering with water, getting wet due to being bathed in water) for on-vehicle use, and can reduce the cost as compared with prior arts.

Means to Solve the Problems

A technical matter set forth herein is not intended to limit, either expressly or implicitly, the claimed invention and express tolerance of such limitation by anyone other than those who would benefit from the invention (e.g., the applicant and the rights holders), but is described merely to facilitate an understanding of the gist of the invention. An outline of the invention from other aspects can be understood, for example, from the claims at the time of filing this patent application.

A case houses, in its internal space, a circuit board. The case has a plate part having a drain hole at one end thereof. The drain hole communicates with the internal space of the case. The other end of the case is sealed to be watertight. However, the probability that water infiltrates into the internal space of the case from one end of the case is less than the probability that water infiltrates into the internal space of the case from the other end of the case. In other words, the case is a case to be used in an environment where the probability that water infiltrates into the internal space of the case from one end of the case is less than the probability that water infiltrates into the internal space of the case from the other end of the case. Further, in other words, the waterproof performance of one end of the case is lower than the waterproof performance of the other end of the case.

Effects of the Invention

According to the present invention, it is possible to obtain an on-vehicle connector unit that has a structure capable of withstanding water exposure for on-vehicle use, and can be configured at a lower cost than prior arts.

DETAILED DESCRIPTION OF THE EMBODIMENTS

First, water exposure of an on-vehicle connector unit to be used while attached to a partition wall through which a cabin side and a vehicle body side of a vehicle are partitioned will be described.

The water exposure from the vehicle body side is assumed to be caused by a large amount of water such as water splashed by tires during traveling of a vehicle or high-pressure washing water when a vehicle is washed. However, with respect to water causing water exposure from the vehicle body side as described above, since intrusion of the water into the cabin side is prevented by existence of the partition wall, the water does not cause water exposure from the cabin side. On the other hand, the water exposure from the cabin side is a phenomenon that occurs infrequently, for example, in such a case that a driver spills drinking water, and even if it does occur, only a small amount of water exposure is assumed.

As described above, there is a large difference in degree between the water exposure from the vehicle body side and the water exposure from the cabin side, and the on-vehicle connector unit according to the present invention takes this point into consideration.

Hereinafter, an embodiment of the present invention will be described with reference to the drawings.

Figure 1:
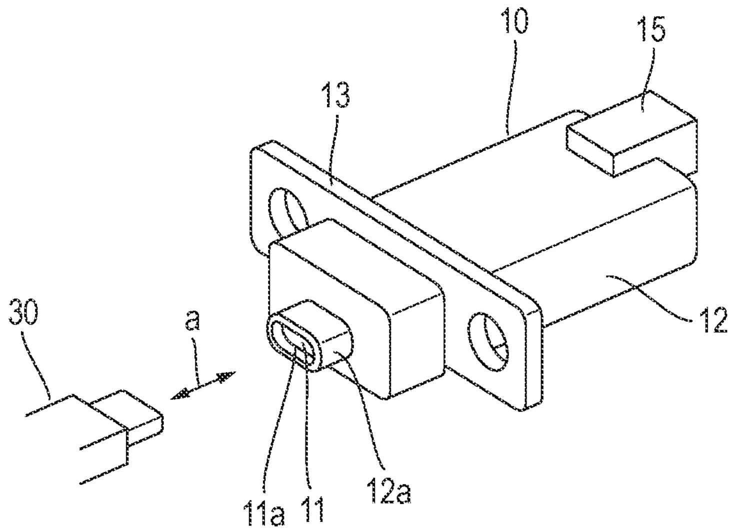
FIG. 1 (PRIOR ART)
FIG. 1 is a perspective view showing a conventional example of an on-vehicle connector unit.
Figure 2:
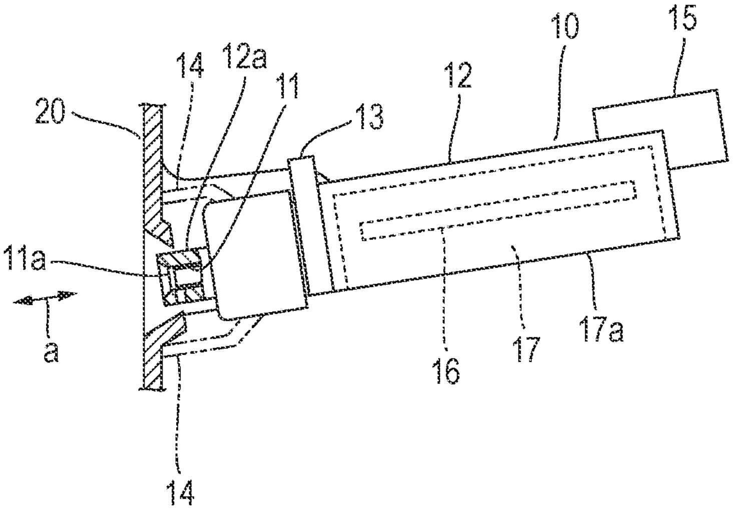
FIG. 2 (PRIOR ART)
FIG. 2 is a partial cross-sectional view showing an attached state of the on-vehicle connector unit shown in FIG. 1.
Figure 3A:
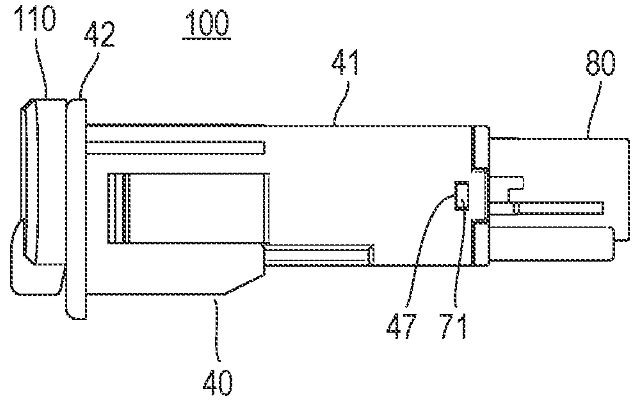
FIG. 3A is a side view showing an embodiment of the on-vehicle connector unit according to the present invention.
Figure 3B:
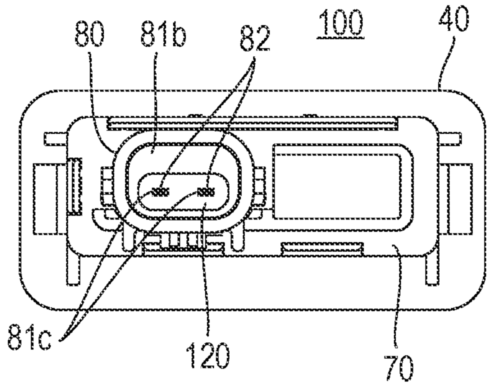
FIG. 3B is a rear view of the on-vehicle connector unit shown in FIG. 3A.
Figure 3C:
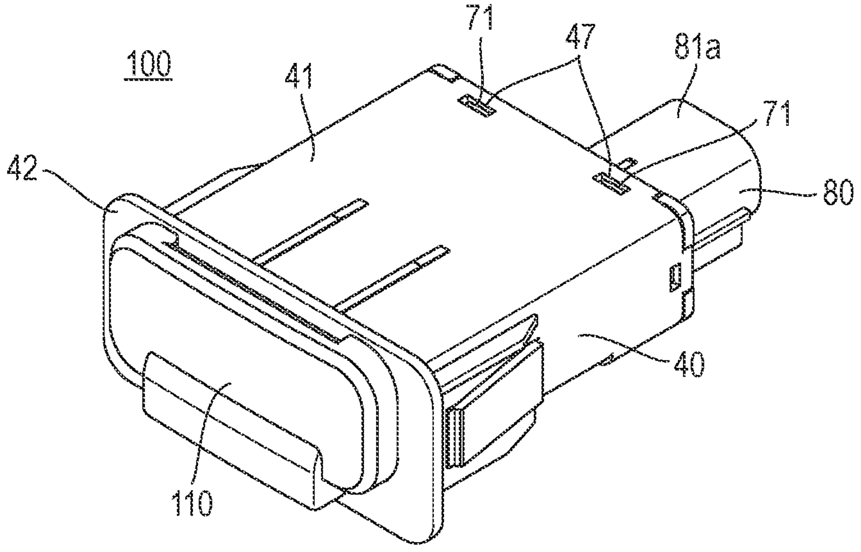
FIG. 3C is a perspective view of the on-vehicle connector unit shown in FIG. 3A.
Figure 4:
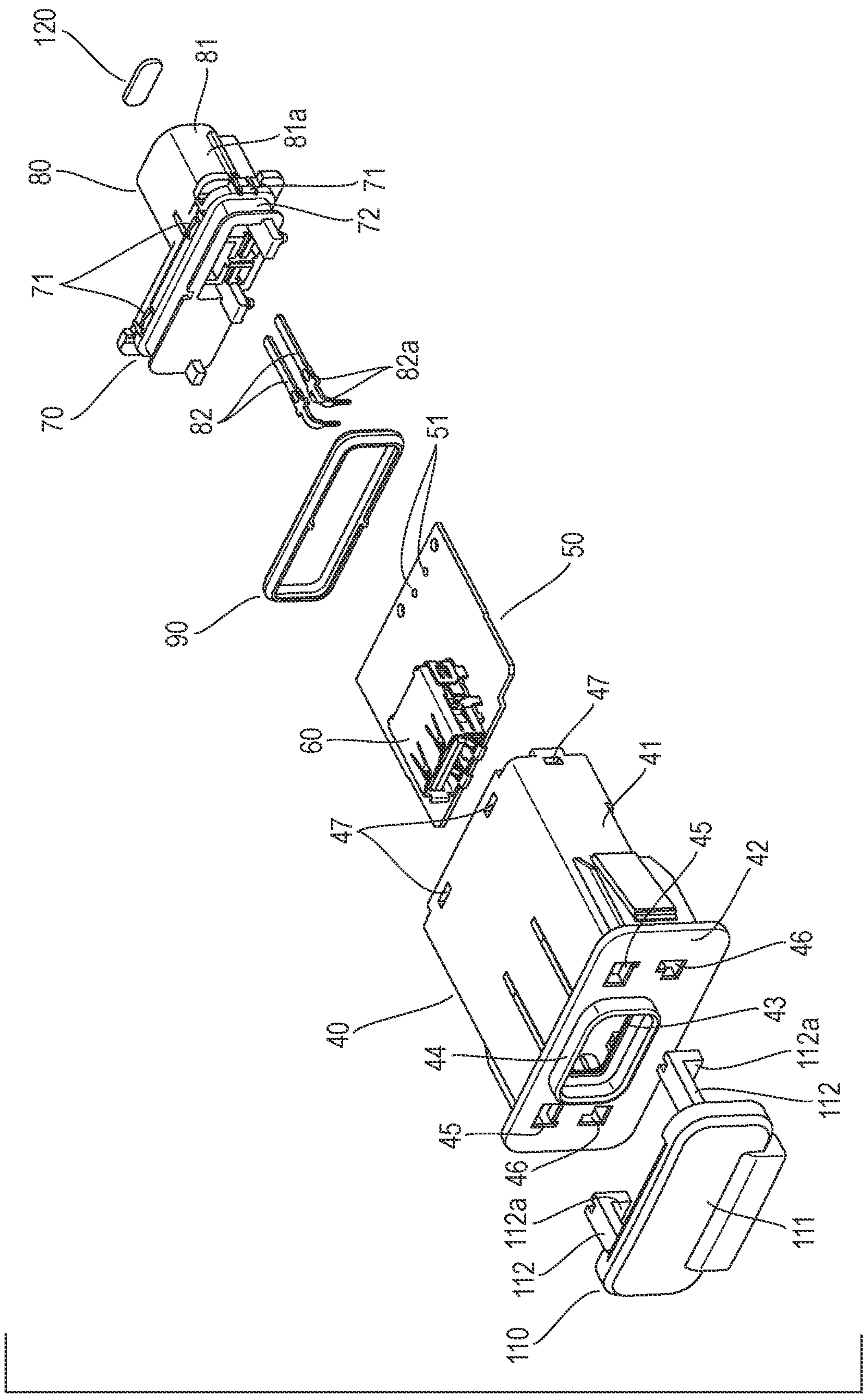
FIG. 4 is an exploded perspective view of the on-vehicle connector unit shown in FIG. 3C.

FIGS. 3A, 3B and 3C show the appearance of an embodiment of the on-vehicle connector unit according to the present invention, and FIG. 4 shows the on-vehicle connector unit 100 shown in FIG. 3C in a state where the on-vehicle connector unit 100 is disassembled into various parts.

In this example, the on-vehicle connector unit 100 is configured by a case 40, a circuit board 50, an interface connector 60, a rear surface cover 70, an internal connector 80, a rubber seal 90, a rubber cap 110, and a potting resin 120, and in this example, a housing 81 of the internal connector 80 is formed integrally with the rear surface cover 70. In FIG. 4, reference numeral 82 represents a terminal of the internal connector 80. The internal connector 80 to be connected to a harness connector on the vehicle body side has two terminals 82 in this example.

Figure 5A:
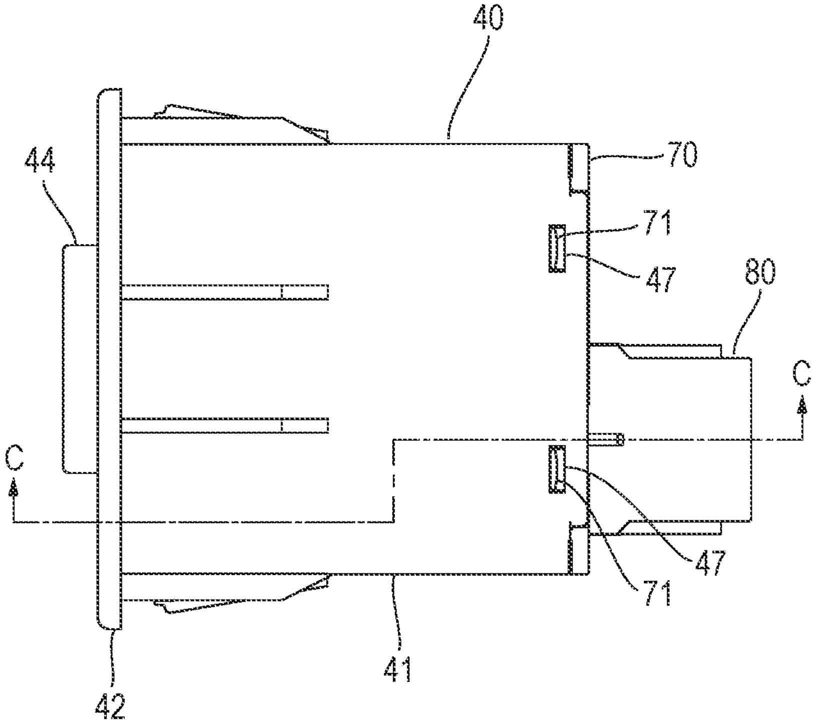
FIG. 5A is a plan view of the on-vehicle connector unit shown in FIG. 3C in a state where a rubber cap is removed.
Figure 5B:
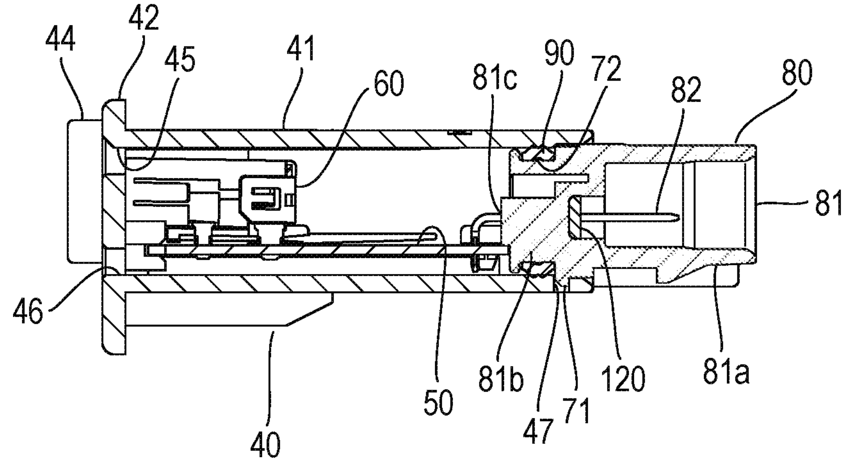
FIG. 5B is a cross-sectional view taken along a line C-C in FIG. 5A.
Figure 6A:
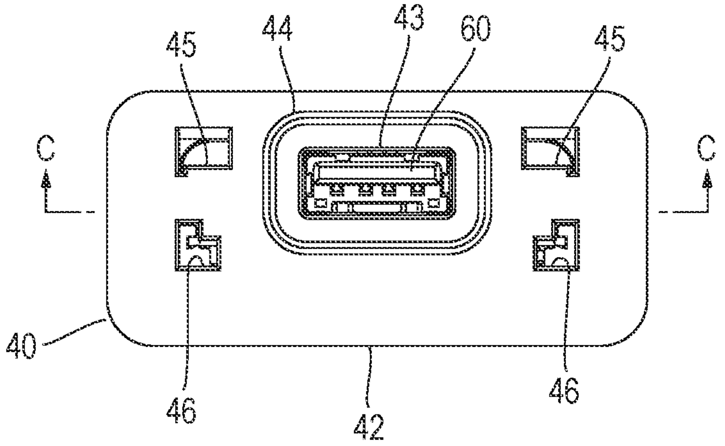
FIG. 6A is a front view of the on-vehicle connector unit shown in FIG. 3C in a state where the rubber cap is removed.
Figure 6B:
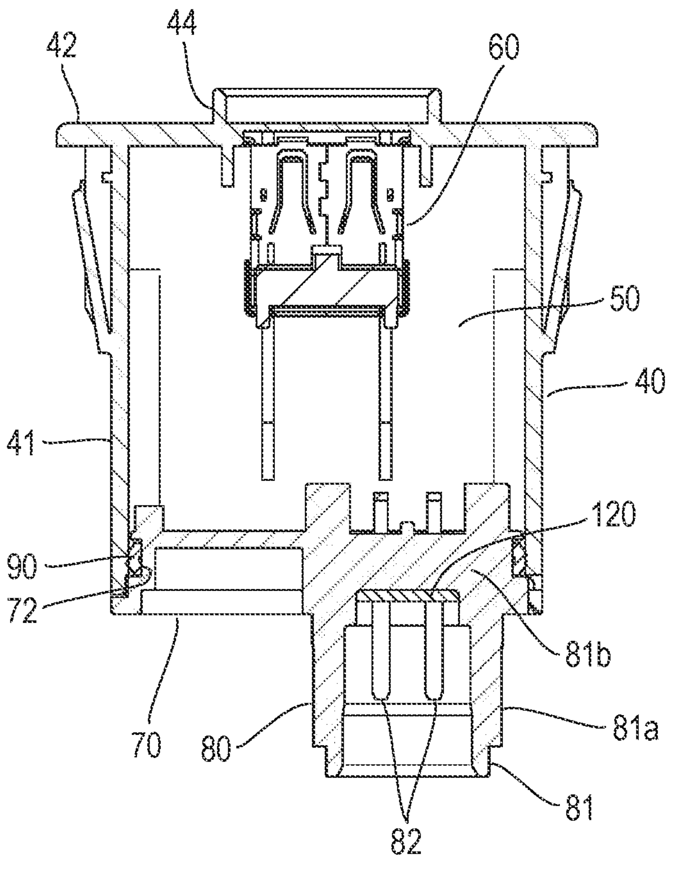
FIG. 6B is a cross-sectional view taken along a line C-C of FIG. 6A.

FIGS. 5B and 5B show details of the cross-sectional structure of the on-vehicle connector unit 100 in a state where illustration of the rubber cap 110 is omitted.

The case 40 has a tubular part 41 having a square tubular shape, and a front surface plate part 42 located at the front end of the tubular part 41. An opening 43 is formed in the front surface plate part 42, and an annular part 44 surrounding the opening 43 is formed to be protruded from the plate surface of the front surface plate part 42. Further, attachment holes 45 are formed in the front surface plate part 42 so as to be arranged on the left and right sides of the annular part 44 respectively, and drain holes 46 are likewise formed so as to be arranged on the left and right sides of the annular part 44 and below the attachment holes 45. All of the opening 43, the attachment holes 45 and the drain holes 46 communicate with the internal space of the tubular part 41.

The housing 81 of the internal connector 80 has a tubular shape, and includes a fitting part 81*a* to be fitted to the harness connector, and a base part 81*b* covering the proximal end of the fitting part 81*a*. The base part 81*b* constitutes a part of the rear surface cover 70, and the fitting part 81*a* protrudes rearward from the rear surface cover 70. Two terminal press-fitting holes 81*c* are formed in the base part 81*b*.

The terminal 82 has an L-shaped bent shape, and a pair of protrusions 82*a* projecting to both sides in the width direction are formed on one side of the L-shape. The terminal 82 is attached to the housing 81 as shown in FIGS. 3B, 5B, etc. by press-fitting one side of the L-shape into the terminal press-fitting hole 81*c*. Further, the other side of the L-shape of the terminal 82 is inserted into a through-hole 51 of the circuit board 50 and connected by soldering.

The terminals 82 of the internal connector 80 are connected to the circuit board 50 as described above, the interface connector 60 is further mounted on the circuit board 50, and this circuit board 50 is accommodated in the tubular part 41 of the case 40. The interface connector 60 connected to a connector of an electronic device such as a smart phone on the cabin side is located so as to face the cabin side through the opening 43 provided in the front surface plate part 42 of the case 40. Note that in this example, the interface connector 60 is a USB Type-A connector having a non-waterproof structure.

A rear end of the tubular part 41 of the case 40 is covered with the rear surface cover 70. The rear surface cover 70 has a plurality of protruding parts 71 which are provided on the outer peripheral surface of the rear surface cover 70 so as to protrude therefrom, and the rear surface cover 70 is attached such that these protruding parts 71 are fitted in a plurality of holes 47 provided in the tubular part 41 to block the rear end of the tubular part 41.

In this example, an annular groove 72 is formed in the outer peripheral surface of the rear surface cover 70, and an annular rubber seal 90 is attached to the annular groove 72 so that the rubber seal 90 is interposed between the inner peripheral surface of the rear end of the tubular part 41 and the outer peripheral surface of the rear surface cover 70. Further, resin potting is applied to a portion where the terminals 82 of the internal connector 80 protrude from the base part 81*b* to the vehicle body side, thereby providing the protruding parts of the terminals 82 with potting resin 120. As a result, the watertight sealing of the rear end of the tubular part 41, that is, the rear end of the case 40 is made complete.

The rubber cap 110 covers the opening 43 of the front surface plate part 42 of the case 40, and has a pair of arm parts 112 on the back surface side of the lid part 111. The attachment of the rubber cap 110 is performed by inserting the arm parts 112 into the two attachment holes 45 of the front surface plate part 42, respectively. Since the arm parts 112 are provided with retaining parts 112*a* at the tips thereof, the retaining parts 112*a* are hooked to the front surface plate part 42, whereby the rubber cap 110 is retained. Further, the rubber cap 110 can be pulled out to the front side by the amount corresponding to the length of the arm parts 112, and the deformation (bending) of the arm parts 112 allows the lid part 111 to be displaced, for example, in the vertical direction.

Therefore, when the on-vehicle connector unit 100 is not in use, by pressing the lid part 111 against the front surface plate part 42, the opening 43 which the interface connector 60 faces can be covered. When the on-vehicle connector unit 100 is used, that is, when a connector of an electronic device on the cabin side is connected to the interface connector 60, by pulling the lid part 111, for example, displacing the lid part 111 upwardly, the connection of the connector can be performed without detaching the rubber cap 110.

Figure 7:
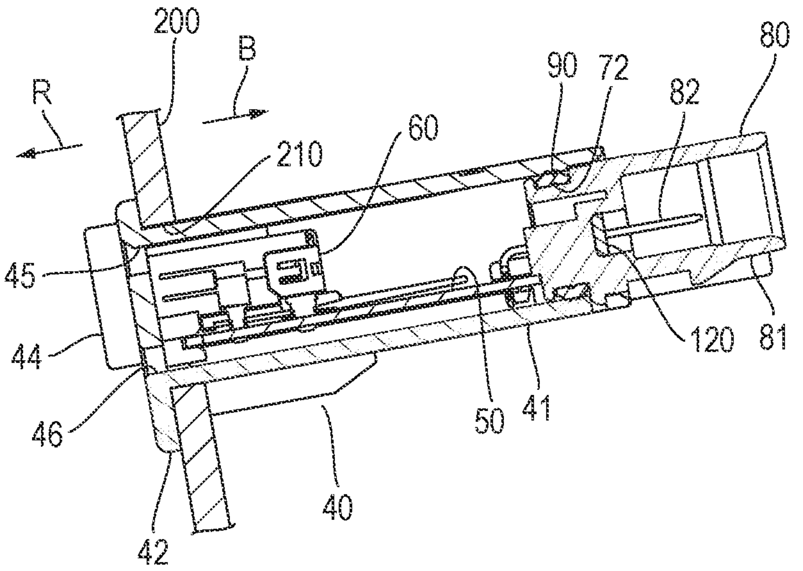
FIG. 7 is a cross-sectional view showing a state in which the on-vehicle connector unit shown in FIG. 3C is attached to a partition wall when illustration of the rubber cap is omitted.

FIG. 7 shows, as an example, a state in which the on-vehicle connector unit 100 described above is attached to a partition wall 200 through which the cabin side and the vehicle body side of a motorcycle are partitioned when the illustration of the rubber cap 110 is omitted. In FIG. 7, an arrow R indicates the cabin side, and an arrow B indicates the vehicle body side.

The on-vehicle connector unit 100 is inserted into an attachment hole 210 provided in the partition wall 200 from the cabin side, and the front surface plate part 42 is attached to the partition wall 200 in close contact therewith. The on-vehicle connector unit 100 attached to the partition wall 200 is in a tilted state as shown in FIG. 7; that is, the on-vehicle connector unit 100 is attached such that the openings on the cabin side of the drain holes 46 faces downward.

The embodiment of the on-vehicle connector unit according to the present invention and the attachment structure thereof have been described above. Since watertight sealing is applied to the rear end of the case 40 which accommodates the circuit board 50, water coming from the vehicle body side does not infiltrate into the case 40 from the rear end of the case 40, and water coming from the vehicle body side is prevented from infiltrating into the cabin side by the partition wall 200. Therefore, the water coming from the vehicle body side does not infiltrate from the front end of the case 40 (the front surface plate part 42) into the case 40, so that the circuit board 50 is not submerged due to water exposure from the vehicle body side.

On the other hand, the drain holes 46 communicating with the tubular part 41 in which the circuit board 50 is accommodated exist in the front surface plate part 42 of the case 40, and are arranged such that one inner wall thereof is located on the extension of the inner bottom surface of the tubular part 41 and the openings thereof on the cabin side face downward when mounted in the vehicle. Therefore, the water coming from the cabin side is well drained by the drain holes 46, so that the circuit board 50 is unlikely to be submerged with a small amount of water coming from the cabin side.

As described above, unlike the waterproof structure in which the circuit board is sealed to be watertight against water exposure from all directions by injecting and filling potting resin into the case as in the prior art, this example provides a proper waterproof structure capable of protecting the circuit board in consideration of the difference in degree between the water exposure from the vehicle body side and the water exposure from the cabin side, which does not require a troublesome and labor-intensive work of injecting and filling potting resin into the case, and the cost can be reduced accordingly.

Note that in the above-described example, the rubber seal 90 is interposed between the rear end of the tubular part 41 of the case 40 and the rear surface cover 70 to perform watertight sealing. However, the rubber seal 90 is unnecessary when it is possible to achieve a watertight structure without any rubber seal. Further, in order to seal a gap that may occur between the terminal press-fitting hole 81*c* and the terminal 82 in the internal connector 80, partial resin potting is applied. However, the potting resin 120 is unnecessary when the terminals 82 are incorporated in the housing 81 by insert molding.

Although the housing 81 of the internal connector 80 is formed integrally with the rear surface cover 70, the internal connector 80 may be configured as a separate body from the rear surface cover 70 so as to be held by the rear surface cover 70.

Although the interface connector 60 is a USB Type-A connector in the above example, there is a case where a USB Type-C connector is used or a case where another connector is used. Therefore, the type of the interface connector 60 is not particularly limited. In addition, the interface connector 60 may have either a non-waterproof structure or a waterproof structure, but the non-waterproof structure connector is advantageous in terms of cost.

Although the circuit board 50 is not submerged in water, the circuit board 50 may be provided with a moisture-proof coating from the viewpoint of water resistance. As the coating agent, for example, a normal-temperature type fluorine coating agent can be used, and a coating agent having urethane-based resin, acrylic-based resin, or silicone-based resin as a film component can also be used.

DESCRIPTION OF REFERENCE NUMERALS

10 USB port
11 mouthpiece part
11*a* port opening
12 casing
12*a* mouthpiece holding part
13 flange
14 hood
15 coupler
16 circuit board
17 potting resin
17*a* potting surface
20 back wall
30 USB plug
40 case
41 tubular part
42 front surface plate part
43 opening
44 annular part
45 attachment hole
46 drain hole
47 hole
50 circuit board
51 through-hole
60 interface connector
70 rear surface cover
71 protruding part
72 annular groove
80 internal connector
81 housing
81*a* fitting part
81*b* base part
81*c* terminal press-fitting hole
82 terminal
82*a* protrusion
90 rubber seal
100 on-vehicle connector unit
110 rubber cap
111 lid part
112 arm part
112*a* retaining part
120 potting resin
200 partition wall
210 attachment hole

What is claimed is:

1. An on-vehicle connector unit to be attached to a partition wall of a vehicle that separates a cabin from a vehicle body, and to interconnect a connector of an electronic device in the cabin with a harness connector in the vehicle body, the on-vehicle connector unit comprising:

a case including a tubular body and a front plate located at a front end of the tubular body, the front plate having an opening;

a circuit board housed in an internal space of the tubular body;

an interface connector mounted on the circuit board to face the cabin from the opening of the front plate, the interface connector being for use in connection to the connector of the electronic device;

a rear cover blocking a rear end of the tubular body; and an internal connector held by the rear cover, the internal connector being for use in connection to the harness connector, wherein the on-vehicle connector unit has a first portion to be located in the vehicle body, the first portion being waterproof to prevent water from entering the internal space of the tubular body, the on-vehicle connector unit has a second portion to be located in the cabin, the second portion being non-waterproof to allow water to enter the internal space of the tubular body, the front plate has a drain hole communicating with the internal space of the tubular body, the drain hole being configured to drain water from the internal space of the tubular body, and the drain hole faces in a same direction as the opening of the front plate faces.

2. The on-vehicle connector unit according to claim 1, wherein the internal connector has a housing formed integrally with the rear cover, the internal connector has a terminal protruding from the housing of the internal connector toward the vehicle body, a portion of the housing from which the terminal of the internal connector protrudes being sealed with potting resin, and the on-vehicle connector unit further comprises a rubber seal sealing a gap between a rear end of the tubular body and the rear cover.

3. The on-vehicle connector unit according to claim 1, wherein the on-vehicle connector unit further comprises a rubber cap movably coupled to the front plate and configured to cover the opening.

4. The on-vehicle connector unit according to claim 2, wherein the on-vehicle connector unit further comprises a rubber cap movably coupled to the front plate and configured to cover the opening.

5. The on-vehicle connector unit according to claim 1, wherein the circuit board is coated with a moisture-proof coating agent.

6. The on-vehicle connector unit according to claim 2, wherein the circuit board is coated with a moisture-proof coating agent.

7. The on-vehicle connector unit according to claim 3, wherein the circuit board is coated with a moisture-proof coating agent.

8. The on-vehicle connector unit according to claim 4, wherein the circuit board is coated with a moisture-proof coating agent.

9. The on-vehicle connector unit according to claim 1, wherein the interface connector has a non-waterproof structure.

10. The on-vehicle connector unit according to claim 2, wherein the interface connector has a non-waterproof structure.

11. The on-vehicle connector unit according to claim 3, wherein the interface connector has a non-waterproof structure.

12. The on-vehicle connector unit according to claim 4, wherein the interface connector has a non-waterproof structure.

13. The on-vehicle connector unit according to claim 5, wherein the interface connector has a non-waterproof structure.

14. The on-vehicle connector unit according to claim 6, wherein the interface connector has a non-waterproof structure.

15. The on-vehicle connector unit according to claim 7, wherein the interface connector has a non-waterproof structure.

16. The on-vehicle connector unit according to claim 8, wherein the interface connector has a non-waterproof structure.

17. The on-vehicle connector unit according to claim 9, wherein the interface connector is a USB connector.

18. The on-vehicle connector unit according to claim 10, wherein the interface connector is a USB connector.

19. The on-vehicle connector unit according to claim 11, wherein the interface connector is a USB connector.

20. The on-vehicle connector unit according to claim 12, wherein the interface connector is a USB connector.

21. The on-vehicle connector unit according to claim 13, wherein the interface connector is a USB connector.

22. The on-vehicle connector unit according to claim 14, wherein the interface connector is a USB connector.

23. The on-vehicle connector unit according to claim 15, wherein the interface connector is a USB connector.

24. The on-vehicle connector unit according to claim 16, wherein the interface connector is a USB connector.

* * * * *